United States Patent
Guo et al.

(10) Patent No.: US 11,308,610 B2
(45) Date of Patent: Apr. 19, 2022

(54) SYSTEMS AND METHODS FOR MACHINE LEARNING BASED AUTOMATIC BULLSEYE PLOT GENERATION

(71) Applicant: SHANGHAI UNITED IMAGING INTELLIGENCE CO., LTD., Shanghai (CN)

(72) Inventors: Yimo Guo, Cambridge, MA (US); Shanhui Sun, Cambridge, MA (US); Terrence Chen, Cambridge, MA (US)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 166 days.

(21) Appl. No.: 16/709,982

(22) Filed: Dec. 11, 2019

(65) Prior Publication Data

US 2021/0183054 A1  Jun. 17, 2021

(51) Int. Cl.
*G06K 9/00* (2006.01)
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10072* (2013.01);
(Continued)

(58) Field of Classification Search
CPC ................ G06T 7/0012; G06T 7/11; G06T 2207/30048; G06T 2207/10072;
(Continued)

(56) References Cited

U.S. PATENT DOCUMENTS

2005/0008209 A1*  1/2005  Matsumoto ........... G06T 7/0012
                                                        382/128
2009/0076385 A1*  3/2009  Jackson ................ G06F 3/0484
                                                        600/437

(Continued)

OTHER PUBLICATIONS

Manuel D. Cerqueira et al., Standardized myocardial segmentation and nomenclature for tomographic imaging of the heart: A statement for healthcare professionals from the Cardiac Imaging Committee of the Council on Clinical Cardiology of the American Heart Association, Journal of the American Society of Echocardiography, 15(5): 463-467, 2002.

(Continued)

*Primary Examiner* — Nan D Huynh
(74) *Attorney, Agent, or Firm* — Metis IP LLC

(57) ABSTRACT

A system for generating a bullseye plot of a heart of a subject is provided. The system may obtain multiple slice images in a plurality of groups, wherein each group corresponds to one of a plurality of sections of the heart and includes at least one slice image of the corresponding section, and each slice image includes part of the right ventricle, part of the left ventricle, and part of the myocardium. The system may also identify at least one landmark associated with the left ventricle by applying a landmark detection network in each of the slice images. The system may further generate the bullseye plot of the heart based on the at least one landmark identified in each of the multiple slice images, wherein the bullseye plot includes a plurality of sectors, each of which represents an anatomical region of the myocardium in one of the plurality of sections.

20 Claims, 10 Drawing Sheets

(52) U.S. Cl.
CPC ............... *G06T 2207/20081* (2013.01); *G06T 2207/20084* (2013.01); *G06T 2207/20101* (2013.01); *G06T 2207/20112* (2013.01); *G06T 2207/30048* (2013.01)

(58) Field of Classification Search
CPC . G06T 2207/20084; G06T 2207/20112; G06T 2207/20081; G06T 2207/20101; G06T 7/12; G16H 30/20
USPC ......................................................... 382/128
See application file for complete search history.

(56) References Cited

U.S. PATENT DOCUMENTS

| | | | | |
|---|---|---|---|---|
| 2011/0249005 | A1* | 10/2011 | Hautvast | A61B 5/7435 345/440 |
| 2012/0101368 | A1* | 4/2012 | Masumoto | G06T 19/20 600/420 |
| 2012/0263368 | A1* | 10/2012 | Nakano | A61B 6/032 382/133 |
| 2015/0035829 | A1* | 2/2015 | Miyamoto | A61B 6/504 345/423 |
| 2017/0209059 | A1* | 7/2017 | Nabutovsky | A61B 5/316 |
| 2017/0221205 | A1* | 8/2017 | Mountney | G06T 7/70 |
| 2020/0178940 | A1* | 6/2020 | Hare, II | A61B 8/5207 |
| 2021/0125037 | A1* | 4/2021 | Oliveira Ferreira | G06T 7/0016 |

OTHER PUBLICATIONS

Qiao Zheng et al., Explainable Cardiac Pathology Classification on Cine MRI with Motion Characterization by Semi-supervised Learning of Apparent Flow, Medical Image Analysis, 2019.

F. Khalifa et al., Automatic Analysis of Left Ventricle Wall Thickness Using Short-axis Cine CMR Images, IEEE International Symposium on Biomedical Imaging, 2011.

* cited by examiner

500

501 — Obtaining multiple slice images in a plurality of groups, wherein the groups correspond to a plurality of sections substantially perpendicular to a long axis of the heart, each group corresponds to one of the plurality of sections and includes at least one slice image of the corresponding section, and each slice image includes part of a right ventricle, part of a left ventricle, and part of a myocardium 502 — In each of the multiple slice images, identifying at least one landmark associated with the left ventricle by applying a landmark detection network 503 — Generating a bullseye plot of the heart based on the at least one landmark identified in each of the plurality of slice images, wherein the bullseye plot includes a plurality of sectors, each of which represents an anatomical region of the myocardium in one of the plurality of sections of the heart

801 — Obtaining a plurality of training samples, each of the plurality of training samples including a sample slice image of a sample heart and a ground truth distance offset map of the sample slice image, the sample slice image being annotated with at least one ground truth landmark of the sample heart, and the ground truth distance offset map including distance information between each pixel and each of the at least one ground truth landmark of the sample slice image 802 — Generating a landmark detection network by training a preliminary model using the plurality of training samples

FIG. 8

SYSTEMS AND METHODS FOR MACHINE LEARNING BASED AUTOMATIC BULLSEYE PLOT GENERATION

TECHNICAL FIELD

The present disclosure generally relates to cardiac analysis, and more particularly, methods and systems for automatically generating a bullseye plot based on a machine learning technique.

BACKGROUND

Medical imaging is widely used in cardiac functionality analysis and disease diagnosis. For example, cine magnetic resonance imaging (CMRI) may be performed to scan the heart of a subject (e.g., a patient) to acquire high-resolution anatomical images of the heart throughout the cardiac cycle. Segmentation of heart structures (e.g., a left ventricle, a right ventricle, and a myocardium) from these anatomical images may enable a measurement of one or more cardiac diagnostic indices. To present data from CMRI, the measurement results from different examinations may be transferred into a bullseye plot, which can be used for data integration and clinical decision-making. Conventionally, the bullseye plot is usually generated manually, which is not only time consuming, but also susceptible to human error or subjectivity. Thus, it is desirable to provide systems and methods for generating a bullseye plot automatically, thereby improving the efficiency and accuracy of cardiac analysis and/or diagnosis.

SUMMARY

According to one aspect of the present disclosure, a system for generating a bullseye plot of a heart of a subject is provided. The heart may include a left ventricle, a right ventricle, and a myocardium around the left ventricle. The system may include at least one storage device including a set of instructions for generating the bullseye plot of the heart of the subject, and at least one processor configured to communicate with the at least one storage device. When executing the instructions, the at least one processor may be configured to direct the system to perform the following operations. The at least one processor may be configured to direct the system to obtain multiple slice images in a plurality of groups, wherein the plurality of groups correspond to a plurality of sections substantially perpendicular to a long axis of the heart, each group corresponds to one of the plurality of sections and includes at least one slice image of the corresponding section, and each slice image includes part of the right ventricle, part of the left ventricle, and part of the myocardium. The at least one processor may be also configured to direct the system to identify at least one landmark associated with the left ventricle by applying a landmark detection network in each of the multiple slice images. The at least one processor may be further configured to direct the system to generating the bullseye plot of the heart based on the at least one landmark identified in each of the multiple slice images, wherein the bullseye plot includes a plurality of sectors, each of which represents an anatomical region of the myocardium in one of the plurality of sections.

In some embodiments, the obtaining the multiple slice images in the plurality of groups may include obtaining a target image volume including the heart of the subject. The obtaining the multiple slice images in the plurality of groups may also include segmenting, from the target image volume, the right ventricle, the left ventricle, and the myocardium of the heart to obtain a segmented target image volume. The obtaining the multiple slice images in the plurality of groups may further include extracting the at least one slice image corresponding to the section from the segmented target image volume for each of the plurality of sections.

In some embodiments, the segmentation of the right ventricle, the left ventricle, and the myocardium of the heart may be performed by applying a cardiac segmentation network, and the cardiac segmentation network is a convolutional network.

In some embodiments, the identifying at least one landmark associated with the left ventricle in the slice image by applying the landmark detection network may include obtaining a distance offset map of the slice image by inputting the slice image into the landmark detection network, the distance offset map including distance information between each pixel of the slice image and each of one or more estimated landmarks. The identifying at least one landmark associated with the left ventricle in the slice image by applying the landmark detection network may further include determining the position of the at least one landmark in the slice image based on the distance offset map and a weight of each pixel of the slice image.

In some embodiments, the at least one landmark in the slice image may include at least one of an upper intersection point between the right ventricle and the myocardium in the slice image, or a lower intersection point between the right ventricle and the myocardium in the slice image.

In some embodiments, the generating the bullseye plot of the heart based on the at least one landmark identified in each of the plurality of slice images may include segmenting the myocardium in the slice image into a plurality of segments corresponding to the plurality of anatomical regions of the myocardium in the section based on the at least one landmark identified in the slice image for each slice image corresponding to each of the plurality of sections. The generating the bullseye plot of the heart based on the at least one landmark identified in each of the plurality of slice images may further include for each anatomical region of the myocardium in each of the plurality of sections, determining a parameter value indicative of a physiological condition of the anatomical region according to the segmentation result of the at least one slice image corresponding to the section; and annotating the sector representing the anatomical region in the bullseye plot according to the parameter value of the anatomical region.

In some embodiments, the plurality of sections may include a basal section, a mid-cavity section, and an apical section.

In some embodiments, the landmark detection network may be trained according to a model training process. The model training process may include obtaining a plurality of training samples. Each of the plurality of training samples may include a sample slice image of a sample heart and a ground truth distance offset map of the sample slice image, wherein the sample slice image may be annotated with at least one ground truth landmark of the sample heart, and the ground truth distance offset map may include distance information between each pixel and each of the at least one ground truth landmark of the sample slice image. The model training process may further include generating the landmark detection network by training a preliminary model using the plurality of training samples.

According to one aspect of the present disclosure, a system for generating a landmark detection network is provided. The system may include at least one storage device storing a set of instructions for generating the landmark detection network, and at least one processor configured to communicate with the at least one storage device. When executing the instructions, the at least one processor may be configured to direct the system to perform the following operations. The at least one processor may be configured to direct the system to obtain a plurality of training samples. Each of the plurality of training samples may include a sample slice image of a sample heart and a ground truth distance offset map of the sample slice image, wherein the sample slice image is annotated with at least one ground truth landmark of the sample heart, and the ground truth distance offset map includes distance information between each pixel and each of the at least one ground truth landmark of the sample slice image. The at least one processor may also be configured to direct the system to generate the landmark detection network by training a preliminary model using the plurality of training samples.

In some embodiments, the at least one ground truth landmark annotated in a sample slice image may include at least one of an upper intersection point between a right ventricle and a myocardium of the sample heart in the sample slice image, or a lower intersection point between the right ventricle and the myocardium of the sample heart in the sample slice image.

In some embodiments, the landmark detection network may be a convolutional network, which includes at least one of a U-NET model, a residual U-NET model, or a dense U-NET model.

In some embodiments, the generating the landmark detection network by training the preliminary model using the plurality of training samples may include initializing parameter values of the preliminary model. The generating the landmark detection network by training the preliminary model using the plurality of training samples may further include training the preliminary model by iteratively updating the parameter values of the preliminary model based on the plurality of training samples.

In some embodiments, the iteratively updating the parameter values of the preliminary model may include performing an iterative operation including one or more iterations. Each of at least one iteration of the iterative operation may include generating a predicted distance offset map by applying of an updated preliminary model determined in a previous iteration for each of at least some of the plurality of training samples. Each of at least one iteration of the iterative operation may also include determining a value of a loss function of the updated preliminary model based on the predicted distance offset map and the ground truth distance offset map of each of the at least some of the plurality of training samples. Each of at least one iteration of the iterative operation may further include updating the parameter values of the updated preliminary model to be used in a next iteration based on the value of the loss function.

In some embodiments, the at least one processor may be configured to direct the system to perform the operations including obtaining multiple slice images in a plurality of groups, wherein each group includes at least one slice image, each group corresponds to a section substantially perpendicular to a long axis of the heart, and each slice image includes part of the right ventricle, part of the left ventricle, and part of the myocardium. The at least one processor may be also configured to direct the system to perform the operations including identifying at least one landmark associated with the left ventricle by applying a landmark detection network in each of the multiple slice images. The at least one processor may be further configured to direct the system to perform the operations including generating the bullseye plot of the heart based on the at least one landmark identified in each of the multiple slice images, wherein the bullseye plot includes a plurality of sectors, each of which represents an anatomical region of the myocardium in one of the plurality of sections.

According to another aspect of the present disclosure, a method for generating a bullseye plot of a heart of a subject may be implemented on a computing device having at least one processor and at least one storage device. The method may include obtaining multiple slice images in a plurality of groups, wherein the plurality of groups correspond to a plurality of sections substantially perpendicular to a long axis of the heart, each group corresponds to one of the plurality of sections and includes at least one slice image of the corresponding section, and each slice image includes part of the right ventricle, part of the left ventricle, and part of the myocardium. The method may also include identifying at least one landmark associated with the left ventricle by applying a landmark detection network in each of the multiple slice images. The method may further include generating the bullseye plot of the heart based on the at least one landmark identified in each of the multiple slice images, wherein the bullseye plot includes a plurality of sectors, each of which represents an anatomical region of the myocardium in one of the plurality of sections.

According to another aspect of the present disclosure, a non-transitory computer-readable storage medium including a set of instructions for generating a bullseye plot of a heart of a subject is provided. When executed by at least one processor, the set of instructions direct the at least one processor to effectuate a method. The method may include obtaining multiple slice images in a plurality of groups, wherein the plurality of groups correspond to a plurality of sections substantially perpendicular to a long axis of the heart, each group corresponds to one of the plurality of sections and includes at least one slice image of the corresponding section, and each slice image includes part of the right ventricle, part of the left ventricle, and part of the myocardium. The method may also include identifying at least one landmark associated with the left ventricle by applying a landmark detection network in each of the multiple slice images. The method may further include generating the bullseye plot of the heart based on the at least one landmark identified in each of the multiple slice images, wherein the bullseye plot includes a plurality of sectors, each of which represents an anatomical region of the myocardium in one of the plurality of sections.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for generating a bullseye plot of a heart of a subject according to some embodiments of the present disclosure;

FIG. 8 is a flowchart illustrating an exemplary process for generating a landmark detection network according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Figure 2:
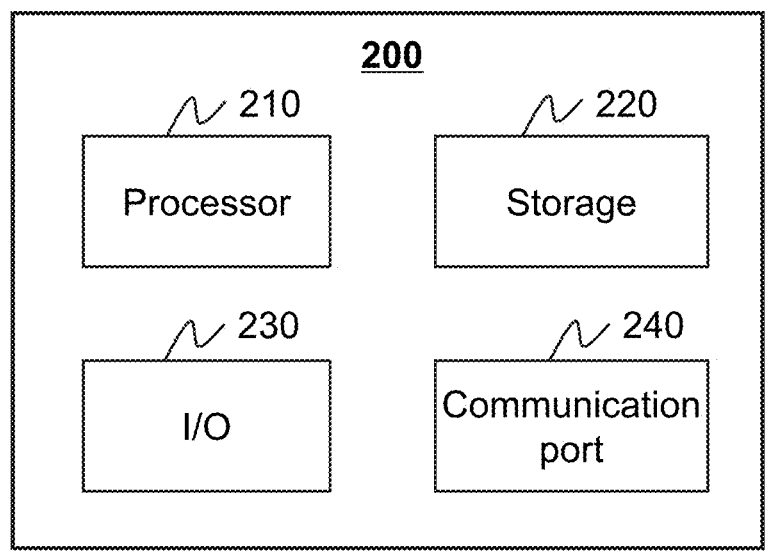
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data, projection data) and/or images of various forms, including a two-dimensional (2D) image, a three-dimensional (3D) image, a four-dimensional (4D) image, etc. The term "pixel" and "voxel" in the present disclosure are used interchangeably to refer to an element of an image. An anatomical structure shown in an image of a subject may correspond to an actual anatomical structure existing in or on the subject's body. The term "segmenting an anatomical structure" or "identifying an anatomical structure" in an image of a subject may refer to segmenting or identifying a portion in the image that corresponds to an actual anatomical structure existing in or on the subject's body.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for non-invasive biomedical imaging, such as for disease diagnostic or research purposes. In some embodiments, the systems may include a single modality imaging system and/or a multi-modality imaging system. The single modality imaging system may include, for example, an ultrasound imaging system, an X-ray imaging system, an computed tomography (CT) system, a magnetic resonance imaging (MRI) system, an ultrasonography system, a positron emission tomography (PET) system, an optical coherence tomography (OCT) imaging system, an ultrasound (US) imaging system, an intravascular ultrasound (IVUS) imaging system, a near-infrared spectroscopy (NIRS) imaging system, a far-infrared (FIR) imaging system, or the like, or any combination thereof. The multi-modality imaging system may include, for example, an X-ray imaging-magnetic resonance imaging (X-ray-MRI) system, a positron emission tomography-X-ray imaging (PET-X-ray) system, a single-photon emission computed tomography-magnetic resonance imaging (SPECT-MRI) system, a positron emission tomography-computed tomography (PET-CT) system, a C-arm system, a digital subtraction angiography-magnetic resonance imaging (DSA-MRI) system, etc. It should be noted that the imaging system described below is merely provided for illustration purposes, and not intended to limit the scope of the present disclosure.

The term "imaging modality" or "modality" as used herein broadly refers to an imaging method or technology that gathers, generates, processes, and/or analyzes imaging information of a subject. The subject may include a biological subject and/or a non-biological subject. The biological subject may be a human being, an animal, a plant, or a portion thereof (e.g., a heart, a breast, etc.). In some embodiments, the subject may be a man-made composition of organic and/or inorganic matters that are with or without life.

An aspect of the present disclosure relates to systems and methods for generating a bullseye plot of a heart of a subject automatically based on a machine learning technique. The heart of the subject may include a left ventricle, a right ventricle, and a myocardium around the left ventricle. The systems may obtain multiple slice images in a plurality of groups. Each of the groups may include at least one slice image and correspond to a section substantially perpendicular to a long axis of the heart. The slice image may include part of the right ventricle, part of the left ventricle, and part of the myocardium. The systems may identify at least one landmark associated with the left ventricle by applying a landmark detection network in each of the multiple slice images, and generate the bullseye plot of the heart based on the at least one landmark identified in each of the multiple slice images. The bullseye plot may include a plurality of sectors, each of which represents an anatomical region of the myocardium in one of the plurality of sections.

According to some embodiments of the present disclosure, the at least one landmark associated with the left ventricle in a slice image may be identified using a landmark detection network, and the bullseye plot may be generated automatically based on the identification result. The term "automatic" refers methods and systems that carry out a process that analyze information and generate results with little or no direct human intervention. The landmark detection network may be a neural network that is configured to receive the slice image and output information (e.g., position information) relating to one or more landmarks in the slice image. In some embodiments of the present disclosure, the landmark identification does not rely on human effort. Instead, the landmark detection network, which learns an optimal mechanism for identifying one or more landmarks from training data, may be used for landmark identification. Compared with defining landmark(s) manually, such methods may be more reliable and robust, insusceptible to human error or subjectivity, and/or fully automated.

In addition, in certain embodiments, for a slice image, the landmark detection network may output a distance offset map that indicates a relative position of each pixel to one or more estimated landmarks in the slice image. The at least one landmark of the slice image may be further determined based on position information of each pixel in the distance offset map and optionally a weight of each pixel (which reflects a reliability of the pixel) in the slice image. In other words, each pixel of the slice image may have a voting right regarding the at least one landmark of the slice image to be identified, and have a different influence on the landmark identification depending on its reliability. This may further improve the accuracy and reliability of the landmark identification result.

Figure 1:
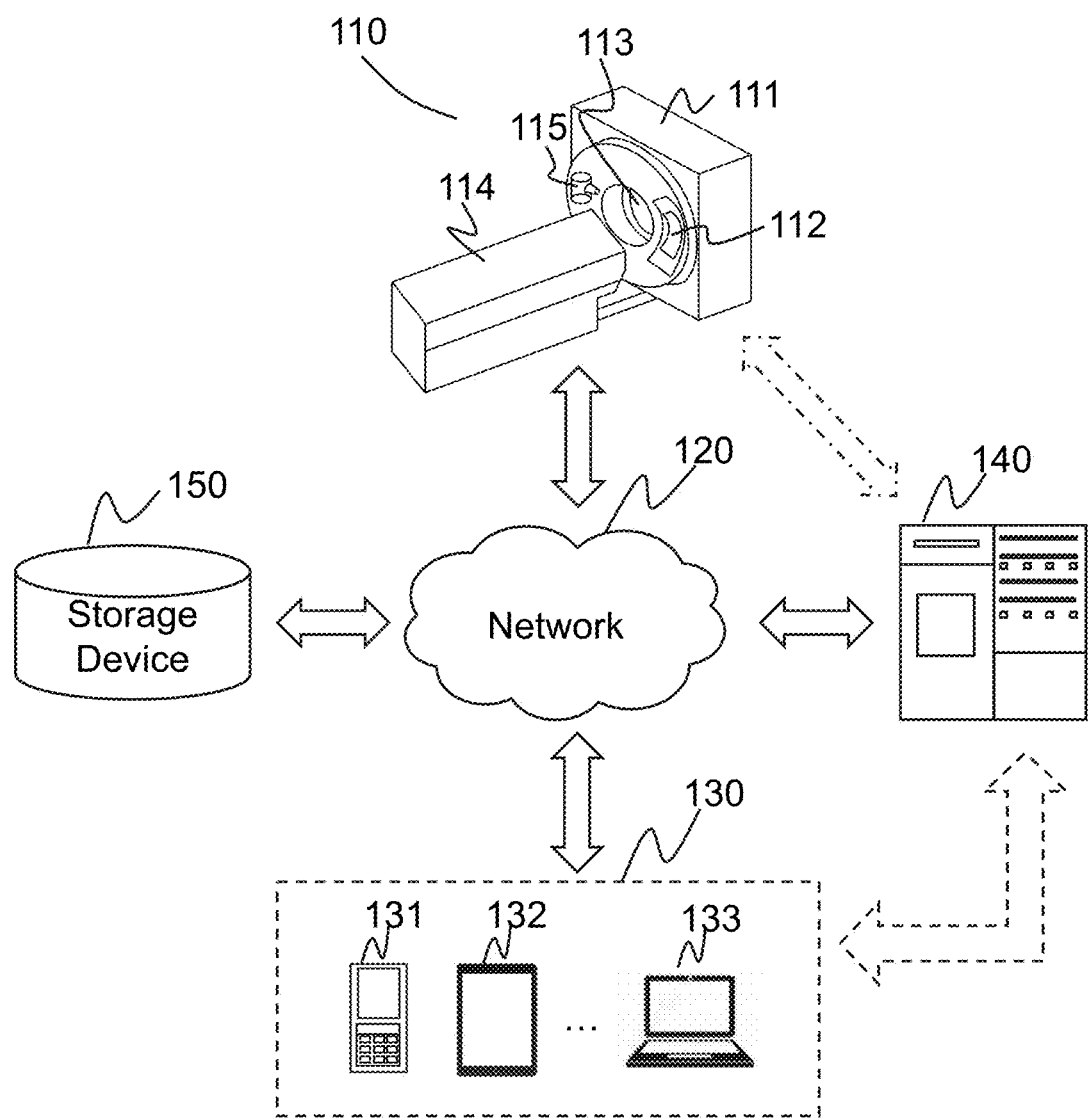
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. As shown, the imaging system 100 may include an imaging device 110, a network 120, one or more terminals 130, a processing device 140, and a storage device 150. In some embodiments, the imaging device 110, the terminal(s) 130, the processing device 140, and/or the storage device 150 may be connected to and/or communicate with each other via a wireless connection (e.g., the network 120), a wired connection, or a combination thereof. The connection between the components of the imaging system 100 may be variable. Merely by way of example, the imaging device 110 may be connected to the processing device 140 through the network 120, as illustrated in FIG. 1. As another example, the imaging device 110 may be connected to the processing device 140 directly or through the network 120. As a further example, the storage device 150 may be connected to the processing device 140 through the network 120 or directly.

The imaging device 110 may generate or provide image data related to a subject via scanning the subject. In some embodiments, the subject may include a biological subject and/or a non-biological subject. For example, the subject may include a specific portion of a body, such as a heart, a breast, or the like. In some embodiments, the imaging device 110 may include a single-modality scanner (e.g., an MRI device, a CT scanner) and/or multi-modality scanner (e.g., a PET-MRI scanner) as described elsewhere in this disclosure. In some embodiments, the image data relating to the subject may include projection data, one or more images of the subject, etc. The projection data may include raw data generated by the imaging device 110 by scanning the subject and/or data generated by a forward projection on an image of the subject.

In some embodiments, the imaging device 110 may include a gantry 111, a detector 112, a detecting region 113, a scanning table 114, and a radioactive scanning source 115. The gantry 111 may support the detector 112 and the radioactive scanning source 115. The subject may be placed on the scanning table 114 to be scanned. The radioactive scanning source 115 may emit radioactive rays to the subject. The radiation may include a particle ray, a photon ray, or the like, or a combination thereof. In some embodiments, the radiation may include a plurality of radiation particles (e.g., neutrons, protons, electron, p-mesons, heavy ions), a plurality of radiation photons (e.g., X-ray, a g-ray, ultraviolet, laser), or the like, or a combination thereof. The detector 112 may detect radiations and/or radiation events (e.g., gamma photons) emitted from the detecting region 113. In some embodiments, the detector 112 may include a plurality of detector units. The detector units may include a scintillation detector (e.g., a cesium iodide detector) or a gas detector. The detector unit may be a single-row detector or a multi-rows detector.

In some embodiments, the imaging device 110 may be an MR scanner including, for example, a magnetic body, a gradient coil, an RF coil, etc. In some embodiments, the MR scanner may be a permanent magnet MR scanner, a superconducting electromagnet MR scanner, or a resistive electromagnet MR scanner, etc., according to types of the magnetic body. In some embodiments, the MR scanner may be a high-field MR scanner, a mid-field MR scanner, and a low-field MR scanner, etc., according to the intensity of the magnetic field.

The network 120 may include any suitable network that can facilitate the exchange of information and/or data for the imaging system 100. In some embodiments, one or more components of the imaging system 100 (e.g., the imaging device 110, the processing device 140, the storage device 150, the terminal(s) 130) may communicate information and/or data with one or more other components of the imaging system 100 via the network 120. For example, the processing device 140 may obtain image data from the imaging device 110 via the network 120. As another example, the processing device 140 may obtain user instruction(s) from the terminal(s) 130 via the network 120.

The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, routers, hubs, switches, server computers, and/or any combination thereof. For example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may be connected to and/or communicate with the imaging device 110, the processing device 140, and/or the storage device 150. For example, the terminal(s) 130 may receive a user instruction to generate a bullseye plot of the subject. As another example, the terminal(s) 130 may display a bullseye plot of the subject generated by the processing device 140. In some embodiments, the terminal(s) 130 may include a mobile device 131, a tablet computer 132, a laptop computer 133, or the like, or any combination thereof. For example, the mobile device 131 may include a mobile phone, a personal digital assistant (PDA), a gaming device, a navigation device, a point of sale (POS) device, a laptop, a tablet computer, a desktop, or the like, or any combination thereof. In some embodiments, the terminal(s) 130 may include an input device, an output device, etc. In some embodiments, the terminal(s) 130 may be part of the processing device 140.

The processing device 140 may process data and/or information obtained from the imaging device 110, the storage device 150, the terminal(s) 130, or other components of the imaging system 100. In some embodiments, the processing device 140 may be a single server or a server group. The server group may be centralized or distributed. For example, the processing device 140 may generate a landmark detection network by training a preliminary model using a plurality of training samples. As another example, the processing device 140 may apply the landmark detection network to identify at least one landmark associated with a left ventricle of a subject from an image of the subject. In some embodiments, the landmark detection network may be generated by a processing device, while the application of the landmark detection network may be performed on a different processing device. In some embodiments, the landmark detection network may be generated by a processing device of a system different than the imaging system 100 or a server different than the processing device 140 on which the application of the landmark detection network is performed. For instance, the landmark detection network may be generated by a first system of a vendor who provides and/or maintains such a landmark detection network, while the landmark identification based on the provided landmark detection network may be performed on a second system of a client of the vendor. In some embodiments, the application of the landmark detection network may be performed online in response to a request for the landmark identification. In some embodiments, the landmark detection network may be determined or generated offline.

In some embodiments, the landmark detection network may be determined and/or updated (or maintained) by, e.g., the manufacturer of the imaging device 110 or a vendor. For instance, the manufacturer or the vendor may load the landmark detection network into the imaging system 100 or a portion thereof (e.g., the processing device 140) before or during the installation of the imaging device 110 and/or the processing device 140, and maintain or update the landmark detection network from time to time (periodically or not). The maintenance or update may be achieved by installing a program stored on a storage device (e.g., a compact disc, a USB drive, etc.) or retrieved from an external source (e.g., a server maintained by the manufacturer or vendor) via the network 120. The program may include a new model (e.g., a new landmark detection network) or a portion of a model that substitute or supplement a corresponding portion of the model.

In some embodiments, the processing device 140 may be local to or remote from the imaging system 100. For example, the processing device 140 may access information and/or data from the imaging device 110, the storage device 150, and/or the terminal(s) 130 via the network 120. As another example, the processing device 140 may be directly connected to the imaging device 110, the terminal(s) 130, and/or the storage device 150 to access information and/or data. In some embodiments, the processing device 140 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 140 may be implemented by a computing device 200 having one or more components as described in connection with FIG. 2.

In some embodiments, the processing device 140 may include one or more processors (e.g., single-core processor(s) or multi-core processor(s)). Merely by way of example, the processing device 140 may include a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The storage device 150 may store data, instructions, and/or any other information. In some embodiments, the storage device 150 may store data obtained from the processing device 140, the terminal(s) 130, and/or the imaging device 110. For example, the storage device 150 may store image data collected by the imaging device 110, one or more images of a subject generated by the processing device 140, a landmark detection network generated by the processing device 140 or retrieved from an external source, or the like. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform as described elsewhere in the disclosure.

In some embodiments, the storage device 150 may be connected to the network 120 to communicate with one or more other components of the imaging system 100 (e.g., the processing device 140, the terminal(s) 130). One or more components of the imaging system 100 may access the data or instructions stored in the storage device 150 via the network 120. In some embodiments, the storage device 150 may be part of the processing device 140.

It should be noted that the above description of the imaging system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the imaging system 100 may include one or more additional components. Additionally or alternatively, one or more components of the imaging system 100 described above may be omitted. As another example, two or more components of the imaging system 100 may be integrated into a single component.

FIG. 2 is a schematic diagram illustrating exemplary hardware and/or software components of a computing device 200 according to some embodiments of the present disclosure. The computing device 200 may be used to implement any component of the imaging system 100 as described herein. For example, the processing device 140 and/or the terminal(s) 130 may be implemented on the computing device 200, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program code) and perform functions of the processing device 140 in accordance with techniques described herein. The computer instructions may include, for example, routines, programs, objects, components, data structures, procedures, modules, and functions, which perform particular functions described herein. For example, the processor 210 may process image data obtained from the imaging device 110, the terminal(s) 130, the storage device 150, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the imaging device 110, the terminal(s) 130, the storage device 150, and/or any other component of the imaging system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure. For example, the storage 220 may store a program for the processing device 140 to execute to generate a landmark detection network.

The I/O 230 may input and/or output signals, data, information, etc. In some embodiments, the I/O 230 may enable a user interaction with the processing device 140. In some embodiments, the I/O 230 may include an input device and an output device. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to another component (e.g., the processing device 140) via, for example, a bus, for further processing. Other types of the input device may include a cursor control device, such as a mouse, a trackball, or cursor direction keys, etc. The output device may include a display (e.g., a liquid crystal display (LCD), a light-emitting diode (LED)-based display, a flat panel display, a curved screen, a television device, a cathode ray tube (CRT), a touch screen), a speaker, a printer, or the like, or a combination thereof.

The communication port 240 may be connected to a network (e.g., the network 120) to facilitate data communications. The communication port 240 may establish connections between the processing device 140 and the imaging device 110, the terminal(s) 130, and/or the storage device 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMAX™ link, a WLAN link, a ZigBee™ link, a mobile network link (e.g., 3G, 4G, 5G), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
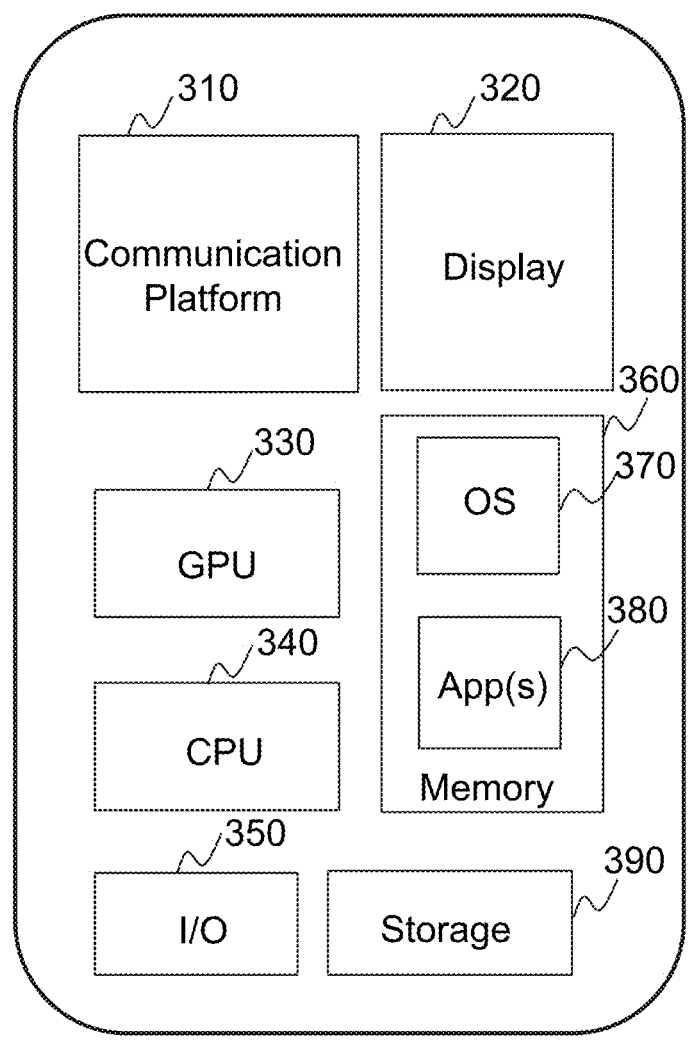
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 according to some embodiments of the present disclosure. In some embodiments, one or more components (e.g., a terminal 130 and/or the processing device 140) of the imaging system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4A:
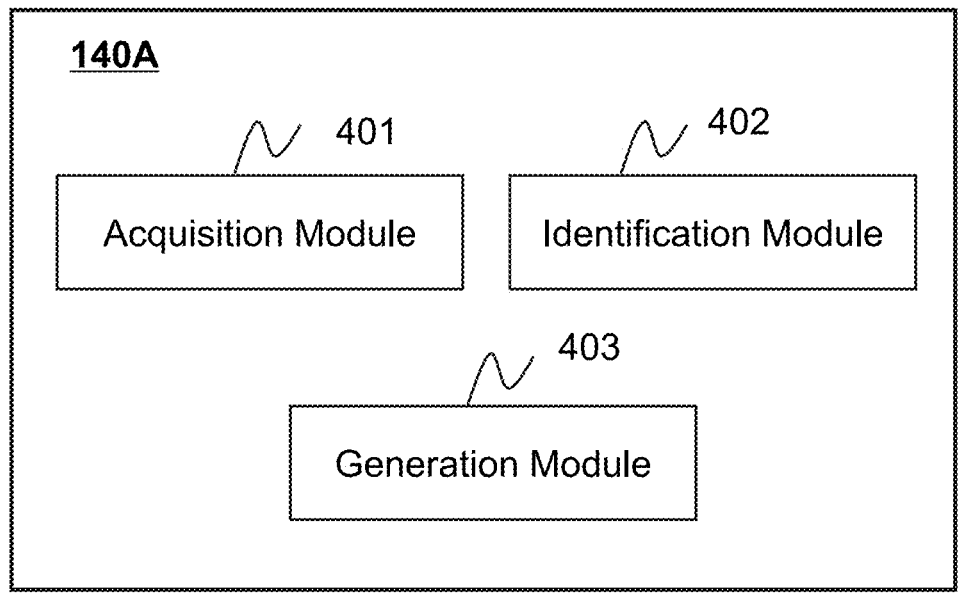
FIGS. 4A and 4B are block diagrams illustrating exemplary processing devices according to some embodiments of the present disclosure.
Figure 4B:
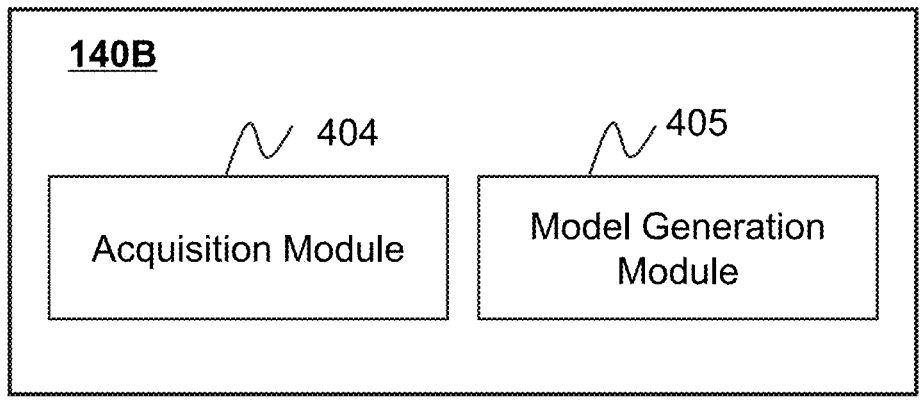

FIGS. 4A and 4B are block diagrams illustrating exemplary processing devices 140A and 140B according to some embodiments of the present disclosure. The processing devices 140A and 140B may be exemplary processing devices 140 as described in connection with FIG. 1. In some embodiments, the processing device 140A may be configured to apply a landmark detection network in generating a bullseye plot of a heart of a subject. The processing device 140B may be configured to generate the landmark detection network using a plurality of training samples. In some embodiments, the processing devices 140A and 140B may be respectively implemented on a processing unit (e.g., a processor 210 illustrated in FIG. 2 or a CPU 340 as illustrated in FIG. 3). Merely by way of example, the processing devices 140A may be implemented on a CPU 340 of a terminal device, and the processing device 140B may be implemented on a computing device 200. Alternatively, the processing devices 140A and 140B may be implemented on a same computing device 200 or a same CPU 340. For example, the processing devices 140A and 140B may be implemented on a same computing device 200.

As shown in FIG. 4A, the processing device 140A may include an acquisition module 401, an identification module 402, and a generation module 403.

The acquisition module 401 may be configured to obtain information relating to the imaging system 100. For example, the acquisition module 401 may obtain multiple slice images in a plurality of groups. The plurality of groups may correspond to a plurality of sections of the heart, e.g., a basal section, a mid-cavity section, and an apical section. Each of the groups may include one or more slice images and correspond to a section substantially perpendicular to the long axis of the heart. Each of the slice images may include part of the right ventricle, part of the left ventricle, and part of the myocardium. In some embodiments, the slice images may correspond to a certain cardiac phase, such as an end-systolic (ES) phase, an end-diastolic (ED) phase, or an intermediate phase between the ES phase and the ED phase of the subject. The slice images may be generated based on image data acquired using an image acquisition device. More descriptions regarding the obtaining of the multiple slice images in the plurality of groups may be found elsewhere in the present disclosure. See, e.g., operation 501 in FIG. 5 and relevant descriptions thereof.

The identification module 402 may be configured to identify at least one landmark associated with the left ventricle by applying a landmark detection network in each of the multiple slice images. The landmark associated with the left ventricle may correspond to a physical point that reflects an anatomical feature of the left ventricle and can be used for automatic bullseye plot generation. The landmark detection network refers to a neural network model that is configured to receive a slice image of a heart and output information (e.g., position information) relating to one or more landmarks in the slice image. More descriptions regarding the identification of the at least one landmark may be found elsewhere in the present disclosure. See, e.g., operation 502 in FIG. 5 and relevant descriptions thereof.

The generation module 403 may be configured to generate the bullseye plot of the heart based on the at least one landmark identified in each of the multiple slice images. The bullseye plot may include a plurality of sectors corresponding to a plurality of anatomical regions of the myocardium in each of the sections. In some embodiments, for each section, the myocardium in each slice image corresponding to the section may be segmented into a plurality of segments corresponding to the plurality of anatomical regions of the myocardium in the section, and one or more parameter values indicative of the physiological conditions of the anatomical regions may be determined according to the segmentation result of the at least one slice image corresponding to the section. More descriptions regarding the generation of the bullseye plot may be found elsewhere in the present disclosure. See, e.g., operation 503 in FIG. 5 and relevant descriptions thereof.

As shown in FIG. 4B, the processing device 140B may include an acquisition module 404 and a model generation module 405.

The acquisition module 404 may be configured to obtain a plurality of training samples. Each of the training samples may include a sample slice image of a sample heart and a ground truth distance offset map of the sample slice image. In some embodiments, the sample slice image may be annotated with at least one ground truth landmark of the sample heart, and the ground truth distance offset map may include distance information between each pixel of the sample slice image and each of the at least one ground truth landmark. More descriptions regarding the acquisition of the training samples may be found elsewhere in the present disclosure. See, e.g., operation 801 in FIG. 8 and relevant descriptions thereof.

The model generation module 405 configured to generate the landmark detection network by training a preliminary model using the plurality of training samples. In some embodiments, the model generation module 405 may train the preliminary model according to a machine learning algorithm as described elsewhere in this disclosure (e.g., FIG. 5 and the relevant descriptions). More descriptions regarding the generation of the landmark detection network may be found elsewhere in the present disclosure. See, e.g., operation 802 in FIG. 8 and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140A and/or the processing device 140B may share two or more of the modules, and any one of the modules may be divided into two or more units. For instance, the processing devices 140A and 140B may share a same acquisition module; that is, the acquisition module 401 and the acquisition module 404 are a same module. In some embodiments, the processing device 140A and/or the processing device 140B may include one or more additional modules, such as a storage module (not shown) for storing data. In some embodiments, the processing device 140A and the processing device 140B may be integrated into one processing device 140.

FIG. 5 is a flowchart illustrating an exemplary process for generating a bullseye plot of a heart of a subject according to some embodiments of the present disclosure. In some embodiments, process 500 may be executed by the imaging system 100. For example, the process 500 may be implemented as a set of instructions (e.g., an application) stored in a storage device (e.g., the storage device 150, the storage 220, and/or the storage 390). In some embodiments, the processing device 140A (e.g., the processor 210 of the computing device 200, the CPU 340 of the mobile device 300, and/or one or more modules illustrated in FIG. 4A) may execute the set of instructions and may accordingly be directed to perform the process 500.

As used herein, the subject may include a biological object and/or a non-biological object that include a heart (or a portion thereof). For example, the subject may be a human being, an animal, or a portion thereof (e.g., a heart, a breast, etc.). As another example, the subject may be a phantom of a human heart. In some embodiments, the heart may include a left ventricle (LV), a right ventricle (RV), and a myocardium around the left ventricle. The left ventricle may be divided into a plurality of sections perpendicular to (or substantially perpendicular to) a long axis of the heart. For example, the left ventricle may be divided into three sections including a basal section, a mid-cavity section, and an apical section, each of which is substantially perpendicular to the long axis of the heart. In certain embodiments, the long axis of the heart refers to the long axis of the left ventricle of the heart.

In some embodiments, one or more measurements may be performed on the heart or a portion of the heart for cardiac health assessment and/or diagnosis. For example, the myocardium in the basal section, the mid-cavity section, and the apical section may be divided into a plurality of anatomical regions, respectively. For each of the anatomical regions of the myocardium, one or more parameter values that indicate a physiological condition of the anatomical region may be determined by analyzing one or more images of the heart. Exemplary parameters may include a myocardial mass, a myocardial thickness (e.g., an end-diastolic myocardial thickness, an end-systolic myocardial thickness), a myocardial blood flow, a strain value, a time of maximum contraction, a time of peak intensity, a time of maximum upslope, a percentage of viable tissue, a thickness of viable tissue, an ejection fraction, or the like. The parameter values of the anatomical regions of the myocardium at different sections of the left ventricle may be recorded and/or displayed in a bullseye plot.

In certain embodiments, the myocardium in the basal section, the mid-cavity section, and the apical section may be divided into 16 or 17 anatomical regions according to a segmented system recommended by American Heart Association (AHA). The myocardium in the basal section may be divided into 6 anatomical regions including the basal anterior, the basal anteroseptal, the basal inferoseptal, the basal inferior, the basal inferolateral, and the basal anterolateral segments. The myocardium in the mid-cavity section may be divided into 6 anatomical regions including the mid anterior, the mid anteroseptal, the mid inferoseptal, the mid inferior, the mid inferolateral, and the mid anterolateral segments. The myocardium in the apical section may be divided into 4 anatomical regions including the apical anterior, the apical septal, the apical inferior, and the apical lateral segments. Optionally, the myocardium at the top of the left ventricle without any cavity may be divided from the myocardium in the apical section as an apex, which may be regarded as the $17^{th}$ anatomical region of the myocardium.

Figure 10:
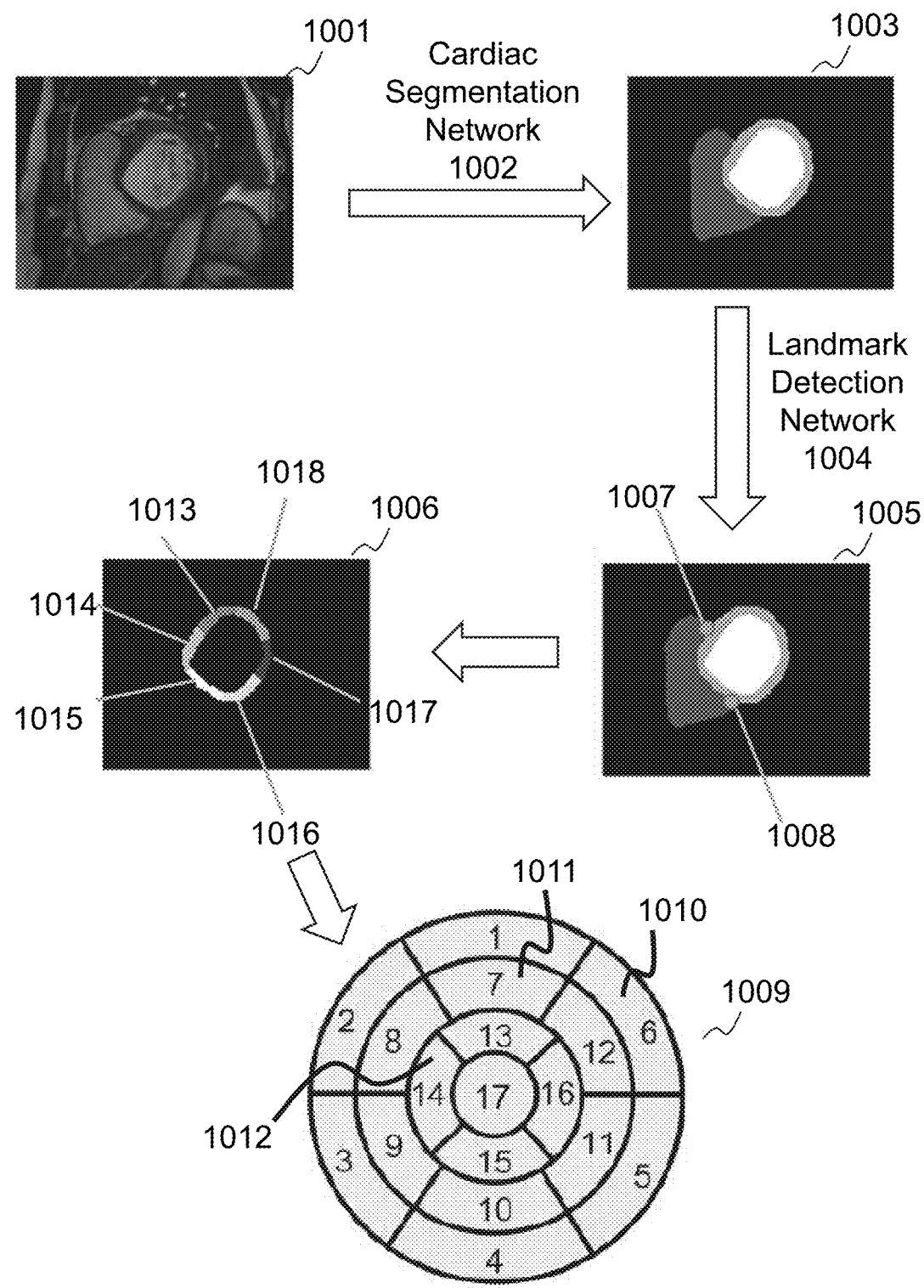
FIG. 10 is a schematic diagram illustrating an exemplary process for generating a bullseye plot of a heart of a subject according to some embodiments of the present disclosure.

The bullseye plot may be a graph 1009 formed by a plurality of concentric rings 1010, 1011, and 1012 as shown in FIG. 10. The concentric rings 1010, 1011, and 1012 may represent the basal section, the mid-cavity section, and the apical section of the left ventricle, respectively. The concentric ring 1010 may include sectors 1 to 6 corresponding to the 6 anatomical regions of the myocardium in the basal section. The concentric ring 1011 may include sectors 7 to 12 corresponding to the 6 anatomical regions of the myocardium in the mid-cavity section. The concentric ring 1012 may include sectors 13 to 16 corresponding to the 4 anatomical regions of the myocardium in the apical section. Optionally, the bullseye plot 1009 may further include a sector 17 located at its center to represent the apex. In some alternative embodiments, the parameter values relating to the myocardium may be recorded and/or displayed in another form, for example, in a table. For the convenience of descriptions, the term "bullseye plot" is used herein to broadly refer to any representation of a measurement result of a heart.

In the generation of the bullseye plot, a plurality of segments of the myocardium corresponding to different anatomical regions of the myocardium may need to be determined from an image of the heart. An accurate segment division from the image may be critical to the accuracy of the generation of the bullseye plot and cardiac disease detection. Conventionally, the segmentation of the myocardium in the image may be performed manually by a user, which is time-consuming and susceptible to the user's variability. In order to facilitate the generation of the bullseye plot, an automatic approach for generating the myocardium segments is provided in the process 500 hereinafter.

In 501, the processing device 140A (e.g., the acquisition module 401, the interface circuits of the processor 210) may obtain multiple slice images in a plurality of groups. The plurality of groups may correspond to the plurality of sections of the heart, i.e., the basal section, the mid-cavity section, and the apical section. Each of the groups may include one or more slice images and correspond to a section substantially perpendicular to the long axis of the heart. Each of the slice images may include part of the right ventricle, part of the left ventricle, and part of the myocardium.

As used herein, a slice image refers to a short-axis image illustrating a cross-section of the heart that is perpendicular to the long axis of the heart. A slice image in a group that corresponds to a specific section may include the left ventricle, the right ventricle, and the myocardium in the specific section. Merely by way of example, a first group corresponding to the basal section, a second group corresponding to the mid-cavity section, and a third group corresponding to the apical section may be obtained. Each of the first, second, and third groups may include 10 slice images of the heart in the corresponding section.

In some embodiments, the slice images may be generated based on image data acquired using an image acquisition device, such as the imaging device 110 of the system 100 or an external image acquisition device. For example, the imaging device 110, such as a CT device, an MRI device, an X-ray device, a PET device, or the like, may be directed to scan the subject (e.g., the heart of the subject). The processing device 140A may reconstruct a target image volume including the heart of the subject based on image data acquired by the imaging device 110 during the scan of the subject. The processing device 140A may further segment the left ventricle, the right ventricle, and the myocardium from the target image volume, and generate the slice images based on the segmentation result. Details regarding the generation of the slice images may be found elsewhere in the present disclosure (e.g., FIG. 6 and the relevant descriptions thereof). In some alternative embodiments, the slice images in the plurality of groups may be previously generated and stored in a storage device (e.g., the storage device 150, the storage 220, the storage 390, or an external source). The left ventricle, the right ventricle, and the myocardium may have been segmented in each of the slice images. The processing device 140A may retrieve the slice images directly from the storage device.

In certain embodiments, the slice images may correspond to a certain cardiac phase, such as an end-systolic (ES) phase, an end-diastolic (ED) phase, or an intermediate phase between the ES phase and the ED phase of the subject. Merely by way of example, a series of cine MRI (CMRI) images may be acquired using an MRI device by executing an MR scan on the heart of the subject. During the MR scan, an electrocardiogram (ECG) signal representing the cardiac motion of the subject may be acquired. A cardiac cycle of the subject may be divided into a plurality of cardiac phases according to the ECG signal, and the image data acquired in the MR scan may be divided into a plurality of image data sets corresponding to the cardiac phases. A CMRI image at the ES phase (or ED phase) may be reconstructed based on the image data set corresponding to the ES phase (or ED phase). The slice images may be generated based on the CMRI image corresponding to the ES phase (or ED phase) by, for example, the processing device 140A by performing process 600 as described in connection with FIG. 6.

In some embodiments, after the slice images are obtained, the processing device 140A may determine whether an orientation of a slice image satisfies a certain condition (e.g., is a short axis orientation). If the orientation of the slice image does not satisfy the certain condition, the processing device 140A may obtain a new slice image whose orientation satisfies the certain condition, e.g., by repeating operation 603.

In 502, the processing device 140A (e.g., the identification module 402, the processing circuits of the processor 210) may identify at least one landmark associated with the left ventricle by applying a landmark detection network in each of the multiple slice images.

As used herein, a landmark associated with the left ventricle may correspond to a physical point that reflects an anatomical feature of the left ventricle and can be used for automatic bullseye plot generation. Merely by way of example, the at least one landmark identified in a slice image may include an upper intersection point (e.g., 1007 as shown in FIG. 10) between the right ventricle and the myocardium and/or a lower intersection point (e.g., 1008 as shown in FIG. 10) between the right ventricle and the myocardium in the slice image. The upper intersection point may be closer to a lung of the subject and the lower intersection point may be closer to a liver of the subject.

The landmark detection network refers to a neural network model that is configured to receive a slice image of a heart and output information (e.g., position information) relating to one or more landmarks in the slice image. The landmark detection network may be of any type of neural network model. In certain embodiments, the landmark detection network may be a convolutional network. Exemplary CNN models may include a Fully Convolutional Network, such as a V-NET model, a U-NET model (e.g., a residual U-NET model, a dense U-NET model), a super-resolution CNN (SRCNN), etc.

Figure 9:
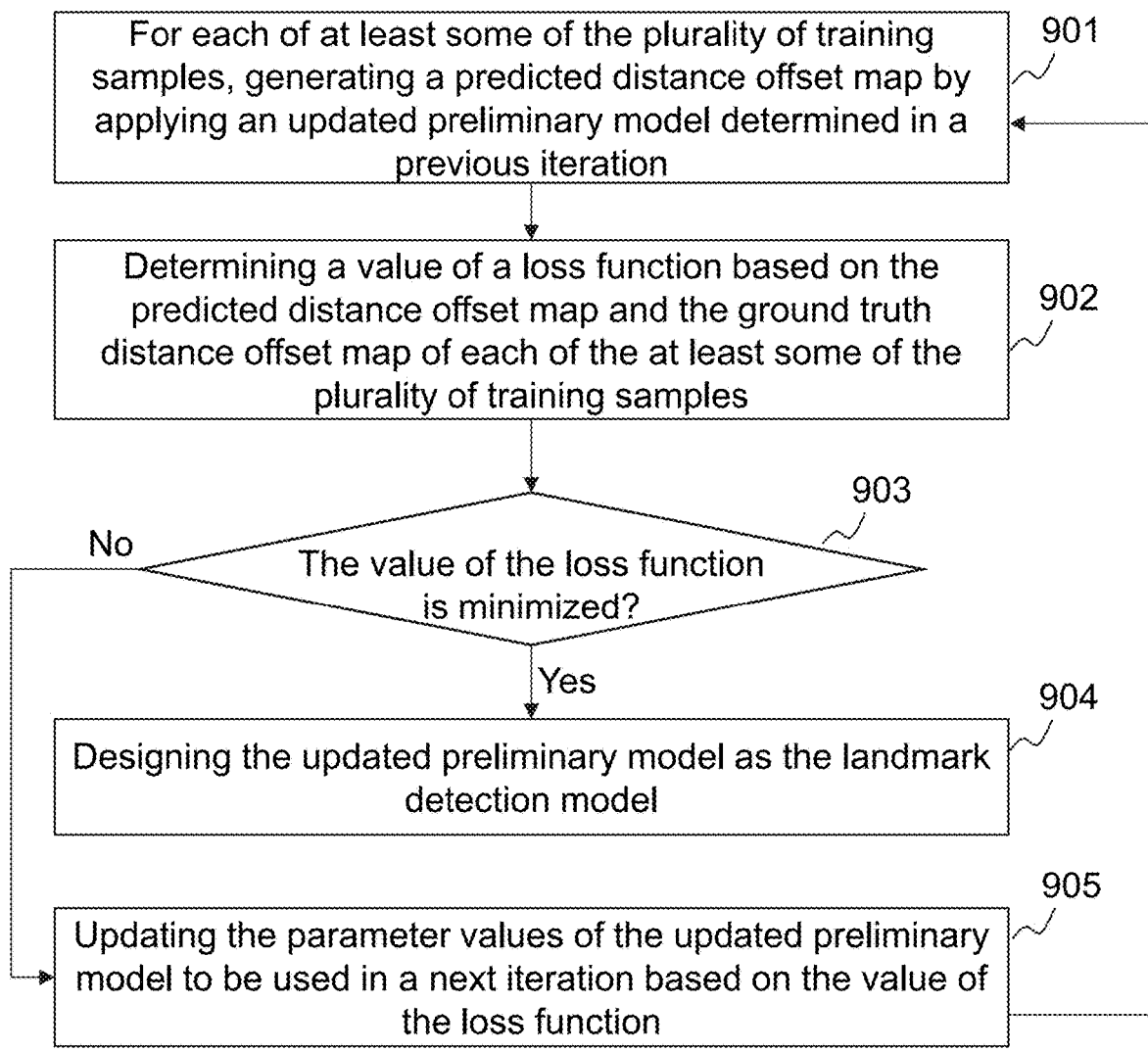
FIG. 9 is a flowchart illustrating an exemplary process for generating a landmark detection network according to some embodiments of the present disclosure.

In some embodiments, the processing device 140A (e.g., the acquisition module 401) may obtain the landmark detection network from one or more components of the imaging system 100 (e.g., the storage device 150, the terminals(s) 130) or an external source via a network (e.g., the network 120). For example, the landmark detection network may be previously trained by a computing device (e.g., the processing device 140B), and stored in a storage device (e.g., the storage device 150, the storage 220, and/or the storage 390) of the imaging system 100. The processing device 140A may access the storage device and retrieve the landmark detection network. In some embodiments, the landmark detection network may be generated according to a machine learning algorithm. The machine learning algorithm may include but not be limited to an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the landmark detection network may be a supervised learning algorithm, a semi-supervised learning algorithm, an unsupervised learning algorithm, or the like. In some embodiments, the landmark detection network may be generated by a computing device (e.g., the processing device 140B) by performing a process (e.g., process 800) for generating a landmark detection network disclosed herein. More descriptions regarding the generation of the landmark detection network may be found elsewhere in the present disclosure (e.g., FIGS. 8-9 and descriptions thereof).

Figure 6:
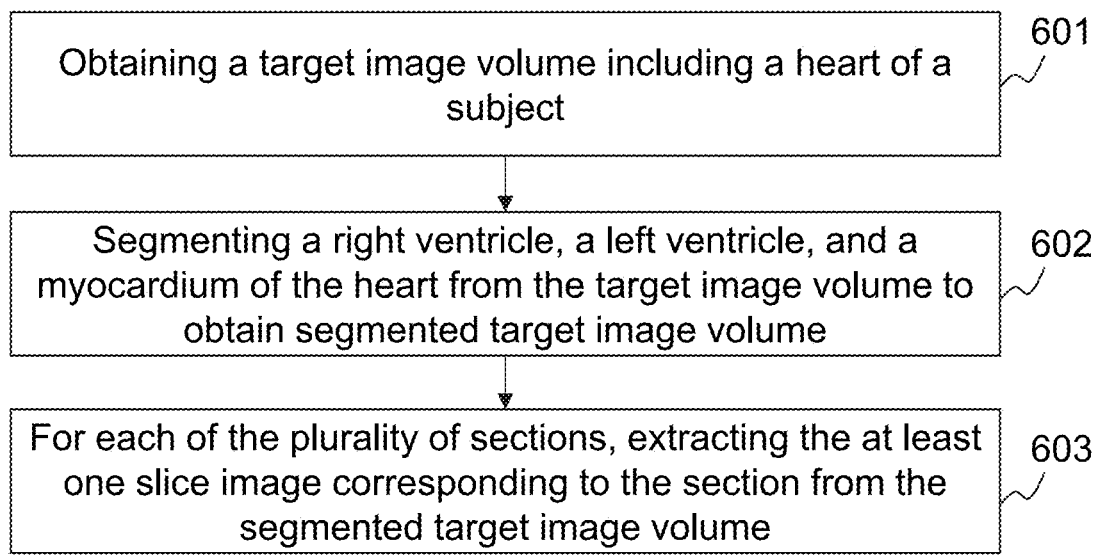
FIG. 6 is a flowchart illustrating an exemplary process for obtaining multiple slice images in a plurality of groups corresponding to a plurality of sections of a heart according to some embodiments of the present disclosure.

In some embodiments, to identify at least one landmark from a slice image by applying the landmark detection network, the processing device 140A may input the slice image into the landmark detection network, and the landmark detection network may directly output the position(s) of the at least one landmark in the slice image. Alternatively, the processing device 140A may input the slice image into the landmark detection network, and the landmark detection network may output a distance offset map that indicates a relative position of each pixel and each of one or more estimated landmarks in the slice image. The processing device 140A may determine the at least one landmark based on the distance offset map and optionally other information, such as a weight of each pixel of the slice image. More descriptions regarding the identification of the at least one landmark in a slice image by applying the landmark detection network may be found elsewhere in the present disclosure (FIG. 6 and the descriptions thereof).

In certain embodiments, for slice images corresponding to different sections of the heart, the processing device 140A may apply a same landmark detection network or different landmark detection networks. For example, each of the basal section, the mid-cavity section, and the apical section may have a corresponding landmark detection network. As another example, the basal section and the mid-cavity section may correspond to a same landmark detection network, and the apical section may correspond to another landmark detection network. For a slice image of a specific section, the processing device 140A may obtain the landmark detection network corresponding to the specific section and apply the obtained landmark detection network on the slice image to identify the at least one landmark in the slice image.

In 503, the processing device 140A (e.g., the generation module 403, the processing circuits of the processor 210) may generate the bullseye plot of the heart based on the at least one landmark identified in each of the multiple slice images.

As aforementioned, the bullseye plot may include a plurality of sectors corresponding to a plurality of anatomical regions of the myocardium in each of the sections. A sector corresponding to a specific anatomical region of the myocardium may be annotated with one or more parameter values of the specific anatomical region for cardiac disease detection. For example, in an exemplary bullseye plot 1009 as shown in FIG. 10, each of the sectors 1 to 6 may be annotated with one or more parameter values of the corresponding anatomical region in the basal section.

In order to generate the bullseye plot, for each section, the processing device 140A may segment the myocardium in each slice image corresponding to the section into a plurality of segments corresponding to the plurality of anatomical regions of the myocardium in the section. For example, the basal section may be divided into 6 anatomical regions including the basal anterior, the basal anteroseptal, the basal inferoseptal, the basal inferior, the basal inferolateral, and the basal anterolateral segments according to the AHA segment system. In a slice image of the basal section, an upper intersection point between the right ventricle and the myocardium may be identified as a landmark associated with the left ventricle. The myocardium in the slice image of the basal section may be regarded as a circle. The upper intersection point may be taken as a start point, and the segments may be generated by rotating clockwise with the angel step of 60° from the start point. As another example, the upper intersection point and a lower intersection point between the right ventricle and the myocardium may be identified as two landmarks associated with the left ventricle. The region between the two landmarks may be divided into the basal anteroseptal and the basal inferoseptal segments. The remaining segments may be determined by dividing the remaining region evenly, for example, by rotating clockwise with a constant angel step (e.g., 60°) from the upper intersection point or anticlockwise with the constant angel step (e.g., 60°) from the lower intersection point. Similarly, the myocardium in each slice image of the mid-cavity section may be divided into 6 segments, and the myocardium in each slice image of the apical section may be divided into 4 segments based on the at least one landmarks in the slice image.

For each anatomical region of the myocardium in each of the plurality of sections, the processing device 140A may determine the one or more parameter values indicative of the physiological conditions of the anatomical region according to the segmentation result of the at least one slice image corresponding to the section. The processing device 140A may further annotate the sector representing each anatomical region in the bullseye plot according to the parameter value(s) of the anatomical region. Taking the basal anterior for instance, the processing device 140A may determine a value of the myocardium thickness in the basal anterior based on the corresponding segment in each slice image of the basal section. If there are multiple slice images corresponding to the basal section, the processing device 140A may determine, for example, an average value of the myocardium thickness as a final value of the myocardium thickness. The final value of the myocardium thickness may be annotated in sector 1 corresponding to the basal anterior in the bullseye plot 1009 as illustrated in FIG. 10. In some embodiments, a parameter value of an anatomical region may be annotated in the corresponding sector as a number or in any other form (e.g., a certain color).

In some embodiments, further processing and/or analysis may be performed on the bullseye plot. For example, the processing device 140A may annotate the sectors of the bullseye plot with different colors based on the parameter values of the sectors, wherein the different colors may intuitively present different health states. As another example, the process 500 may be performed on different sets of slice images corresponding to different cardiac phases of the subject, so as to generate a plurality of bullseye plots corresponding to the different cardiac phases. The processing device 140A may further analyze a dynamic change of the heart during the cardiac cycle based on the plurality of bullseye plots.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may be accomplished with one or more additional operations not described and/or without one or more of the operations discussed above. For example, the process 500 may include an additional operation to transmit the bullseye plot to a terminal device (e.g., a terminal device 130 of a doctor) for display.

FIG. 6 is a flowchart illustrating an exemplary process for obtaining multiple slice images in a plurality of groups corresponding to a plurality of sections of a heart according to some embodiments of the present disclosure. In some embodiments, process 600 may be executed by the imaging system 100. For example, the process 600 may be implemented as a set of instructions (e.g., an application) stored in a storage device (e.g., the storage device 150, the storage 220, and/or the storage 390). In some embodiments, the processing device 140A (e.g., the processor 210 of the computing device 200, the CPU 340 of the mobile device 300, and/or one or more modules illustrated in FIG. 4A) may execute the set of instructions and may accordingly be directed to perform the process 600. In some embodiments, one or more operations of the process 600 may be performed to achieve at least part of operation 501 as described in connection with FIG. 5.

In 601, the processing device 140A (e.g., the acquisition module 401, the interface circuits of the processor 210) may obtain a target image volume including a heart of a subject.

As used herein, a target image volume including a heart of a subject refers to a 3D image including the heart. For example, the target image volume may be a 3D MRI image of the heart at an ES or ED phase. In some embodiments, the target image volume may be reconstructed by the processing device 140A based on image data acquired in a scan, e.g., an MRI scan of the subject. Alternatively, the target image volume may be previously generated and stored in a storage device (e.g., the storage device 150, the storage 220, the storage 390, or an external source), and the processing device 140A may retrieve the target image volume from the storage device.

In 602, the processing device 140A (e.g., the acquisition module 401, the interface circuits of the processor 210) may segment a right ventricle, a left ventricle, and a myocardium of the heart from the target image volume to obtain a segmented target image volume.

As used herein, segmenting a specific organ from an image refers to segmenting a region in the image that corresponds to the specific organ. For example, a first set of voxels corresponding to physical points on the right ventricle, a second set of voxels corresponding to physical points on the left ventricle, and a third set of voxels corresponding to physical points on the myocardium may be identified from the target image volume. Optionally, the first, second, and third sets of voxels may be assigned with different labels or represented in different colors to distinguish them.

In some embodiments, the right ventricle, the left ventricle, and the myocardium may be segmented from the target image volume manually by a user (e.g., a doctor, an imaging specialist, a technician) by, for example, annotating the target image volume displayed on a user interface. Alternatively, the right ventricle, the left ventricle, and the myocardium may be segmented by the processing device 140A automatically according to an image analysis algorithm (e.g., an image segmentation algorithm). Alternatively, the right ventricle, the left ventricle, and the myocardium may be segmented by the processing device 140A semi-automatically based on an image analysis algorithm in combination with information provided by a user. Exemplary information provided by the user may include a parameter relating to the image analysis algorithm, a position parameter relating to a region to be segmented, an adjustment to, or rejection or confirmation of a preliminary segmentation result generated by the processing device 140A, etc.

In certain embodiments, the processing device 140A may perform the segmentation on the target image volume by applying a first cardiac segmentation network. The first cardiac segmentation network may be configured to receive 3D image data of a heart of a subject and segment the right ventricle, the left ventricle, and the myocardium of the heart from the 3D image data. The first cardiac segmentation network may be of any type of neural network model. In certain embodiments, the landmark detection network may be a convolutional network. Exemplary CNN models may include a Fully Convolutional Network, such as a V-NET model, a U-NET model (e.g., a residual U-NET model, a dense U-NET model), a super-resolution CNN (SRCNN), etc. In some embodiments, the processing device 140A (e.g., the acquisition module 401) may obtain the first cardiac segmentation network from one or more components of the imaging system 100 (e.g., the storage device 150, the terminals(s) 130) or an external source via a network (e.g., the network 120). For example, the first cardiac segmentation network may be previously trained by a computing device (e.g., the processing device 140B), and stored in a storage device (e.g., the storage device 150, the storage 220, and/or the storage 390) of the imaging system 100. The processing device 140A may access the storage device and retrieve the first cardiac segmentation network. In some embodiments, the first cardiac segmentation network may be generated according to a machine learning algorithm as described elsewhere in this disclosure (e.g., FIG. 5 and the relevant descriptions).

Merely by way of example, the first cardiac segmentation network may be trained according to a supervised learning algorithm by the processing device 140B. The processing device 140B may obtain a plurality of training images and a preliminary segmentation model. Each training image may include a sample heart, in which the right ventricle, the left ventricle, and the myocardium may have been annotated by a user as a ground truth segmentation result. The preliminary segmentation model to be trained may include one or more model parameters, such as the number (or count) of layers, the number (or count) of nodes, a loss function, or the like, or any combination thereof. Before training, the preliminary segmentation model may have one or more initial parameter values of the model parameter(s). The training of the preliminary segmentation model may include one or more iterations to iteratively update the model parameters of the preliminary segmentation model based on the training images until a termination condition is satisfied in a certain iteration. Exemplary termination conditions may be that the value of the loss function obtained in the certain iteration is less than a threshold value, that a certain count of iterations have been performed, that the loss function converges such that the difference of the values of the loss function obtained in a previous iteration and the current iteration is within a threshold value, etc. The loss function may be used to measure a discrepancy between a segmentation result predicted by the preliminary segmentation model in an iteration and the ground truth segmentation result. Exemplary loss functions may include a focal loss function, a log loss function, a cross-entropy loss, a Dice ratio, or the like.

In 603, for each of the plurality of sections, the processing device 140A (e.g., the acquisition module 401, the interface circuits of the processor 210) may extract at least one slice image corresponding to the section from the segmented target image volume.

For example, the processing device 140A may divide the segmented target image volume into first, second, and third parts by dividing the left ventricle into a basal section, a mid-cavity section, and an apical section perpendicular to the long axis of the heart. In the first part corresponding to the basal section, the processing device 140A may extract at a first number of cross-section images perpendicular to the long axis of the heart as the at least one slice image of the basal section. Similarly, the processing device 140A may extract a second number of slice images of the mid-cavity section from the second part, and a third number of slice images of the apical section from the third part. The first number, the second number, and the third number may be equal to any positive integer, which may be equal to, or partially or completely different from each other.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 600 may be accomplished with one or more additional operations not described and/or without one or more of the operations discussed above. For example, operations 602 and 603 may be integrated into a single operation. As another example, operation 603 may be performed before the operation 602. For example, the processing device 140A may first extract at least one slice image corresponding to each section from the original target image volume. The processing device 140A may then segment the right ventricle, the left ventricle, and the myocardium of the heart from each slice image by applying a second cardiac segmentation network, wherein the second cardiac segmentation network may be used to segment heart structures from a 2D image. Optionally, the segmented slice images may be stored in a storage device and retrieved in operation 501 for further processing, e.g., generating a bullseye plot of the subject.

In some embodiments, one or more operations of the process 500 and/or the process 600 may be performed on image data corresponding to an ES phase and/or an ED phase of the subject. The processing result of the image data corresponding to the ES phase and/or the ED phase may be used in processing image data corresponding to other cardiac phases of the subject. Merely by way of example, a target slice image the ED phase with labels of heart structures (e.g., the left ventricle, the right ventricle, and the myocardium) may be generated by performing the process 600 on a target image volume at the ED phase. A slice image corresponding to an immediate phase may be processed (e.g., resampled, cropped, padding, normalized) to generate a processed slice image that has a same format (e.g., size and/or resolution) as the target slice image at the ED phase. The labels of the heart structures in the slice image corresponding to the immediate phase may be generated based on the labels of the heart structures in the target slice image.

Figure 7:
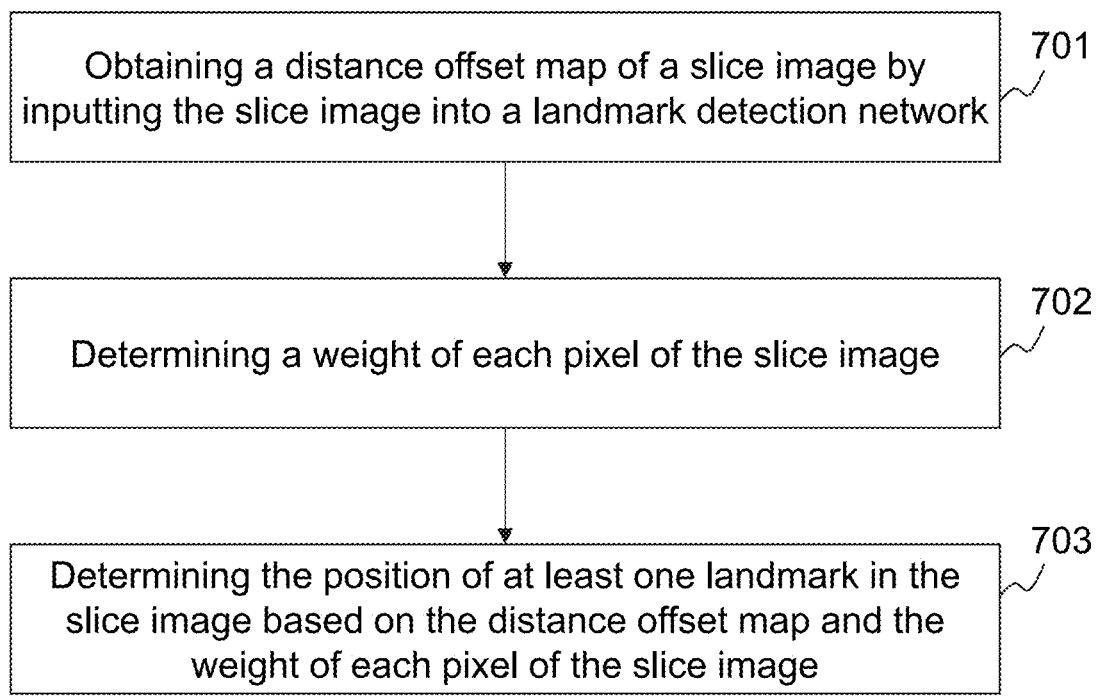
FIG. 7 is a flowchart illustrating an exemplary process for identifying at least one landmark associated with a left ventricle in a slice image according to some embodiments of the present disclosure.

FIG. 7 is a flowchart illustrating an exemplary process for identifying at least one landmark associated with a left ventricle in a slice image according to some embodiments of the present disclosure. In some embodiments, process 700 may be executed by the imaging system 100. For example, the process 700 may be implemented as a set of instructions (e.g., an application) stored in a storage device (e.g., the storage device 150, the storage 220, and/or the storage 390). In some embodiments, the processing device 140A (e.g., the processor 210 of the computing device 200, the CPU 340 of the mobile device 300, and/or one or more modules illustrated in FIG. 4A) may execute the set of instructions and may accordingly be directed to perform the process 700. In some embodiments, one or more operations of the process 700 may be performed to achieve at least part of operation 502 as described in connection with FIG. 5. For example, the process 700 may be performed on each slice image obtained in operation 501.

As described in connection with 502, the at least one landmark may correspond to physical point(s) that reflects an anatomical feature of the left ventricle and can be used for automatic bullseye plot generation. For illustration purposes, the following descriptions are described with reference to the identification of an upper intersection point and a lower intersection point between the right ventricle and the myocardium in the slice image. This is not intended to be limiting, and the at least one landmark may include one of the upper and lower intersection points and optionally other points in the slice image.

In 701, the processing device 140A (e.g., the acquisition module 401, the interface circuits of the processor 210) may obtain a distance offset map of the slice image by inputting the slice image into a landmark detection network.

The distance offset map includes distance information between each pixel of the slice image and each of one or more estimated landmarks. For example, the slice image may be represented in a 2D coordinate system including an X-axis and a Y-axis. For a certain pixel of the slice image, the distance offset map may include a distance between the certain pixel and an estimated upper intersection point along the X-axis, a distance between distance between the certain pixel and the estimated upper intersection point along the Y-axis, a distance between the certain pixel and an estimated lower intersection point along the X-axis, a distance between distance between the certain pixel and the estimated lower intersection point along the Y-axis. The estimated landmarks of different pixels in the slice image may be the same or different. In other words, each pixel may have a voting right regarding the upper and lower intersection points to be identified. This may improve the identification accuracy of the upper and lower intersection points compared with directly outputting positions of the upper and lower intersection points.

In some embodiments, the distance offset map of the slice image may include a first distance offset map including distance information along the X-axis direction and/or a second distance offset map including distance information along the Y-axis direction. For example, if the image resolution of a slice image is 256×256, the landmark detection network may output two matrixes with a size of 256×256 as the first and second distance offset maps, respectively. Optionally, the two matrixes may be represented as two images.

In certain embodiments, the slice image may be located at a section of the heart and the landmark detection network used in 701 may correspond to the section of the slice image. For example, a slice image of a basal section may be inputted into a landmark detection network corresponding to the basal section.

In 702, the processing device 140A (e.g., the identification module 402, the processing circuits of the processor 210) may determine a weight of each pixel of the slice image.

The weight of a pixel may reflect importance and/or reliability of the pixel in the identification of the at least one landmark. For example, if a first pixel has a higher weight than a second pixel, the distance information of the first pixel in the distance offset map may have higher reliability than that of the second pixel. In some embodiments, the weight the pixel may be set by a user or determined by the processing device 140A. For example, the processing device 140A may determine the weight of the pixel according to the position of the pixel. A higher weight may be assigned to the pixel if the pixel corresponds to a physical point on the left ventricle, the right ventricle, or the myocardium. As another example, the processing device 140A may input the slice image into a weight determination model to obtain a weight of each pixel of the slice image. The weight determination model may be previously trained using at least one training slice image, wherein each pixel in the at least one training slice image may have a known weight (e.g., annotated by a user).

In 703, the processing device 140A (e.g., the identification module 402, the interface circuits of the processor 210) may determine the position of the at least one landmark in the slice image based on the distance offset map and the weight of each pixel of the slice image.

For illustration purposes, the determination of the upper intersection point is described as an example. Merely by way of example, for each pixel of the slice image, the processing device 140A may determine the position of a corresponding estimated upper intersection point based on the distance offset map and the position of the pixel. The processing device 140A may further determine the position of the upper intersection point weighted averaging the positions of the estimated upper intersection points based on the weight of each pixel. As another example, the processing device 140A may remove a portion of the pixels whose weight is less than a threshold (such as 0.4, 0.5, 0.6, 0.7, 30%, 40%, 50%, 60%, etc.). The processing device 140A may further determine the position of the upper intersection point based on the remaining pixel(s). By assigning different weights to different pixels, the position of the at least one landmark may be mainly determined by the pixels having higher reliability and importance, thereby improving the accuracy and reliability of the determination result.

It should be noted that the above description regarding the process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 700 may be accomplished with one or more additional operations not described and/or without one or more of the operations discussed above. For example, operations 701 and 702 may be integrated into a single operation, in which the landmark detection network may output a weighted distance offset map that includes distance information as well as a weight of each pixel. As another example, the operation 702 may be omitted or the weight of each pixel of the slice image may be assigned with a same value in 702. In some alternative embodiments, the processing device 140A may input the slice image into the landmark detection network, and the landmark detection network may directly output a position of the at least one landmark in the slice image.

FIG. 8 is a flowchart illustrating an exemplary process for generating a landmark detection network according to some embodiments of the present disclosure. In some embodiments, process 800 may be executed by the imaging system 100. For example, the process 800 may be implemented as a set of instructions (e.g., an application) stored in a storage device (e.g., the storage device 150, the storage 220, and/or the storage 390). In some embodiments, the processing device 140B (e.g., the processor 210 of the computing device 200, the CPU 340 of the mobile device 300, and/or one or more modules illustrated in FIG. 4B) may execute the set of instructions and may accordingly be directed to perform the process 800. Alternatively, the process 800 may be performed by a computing device of a system of a vendor that provides and/or maintains such a landmark detection network, wherein the system of the vendor is different from the imaging system 100. For illustration purposes, the following descriptions are described with reference to the implementation of the process 800 by the processing device 140B, and not intended to limit the scope of the present disclosure.

In 801, the processing device 140B (e.g., the acquisition module 404, the interface circuits of the processor 210) may obtain a plurality of training samples. Each of the training samples may include a sample slice image of a sample heart and a ground truth distance offset map of the sample slice image.

As used herein, a sample heart refers to the heart of a sample subject that is of the same type of subject as the subject as described in connection with FIG. 5. The sample slice image of a sample heart refers to a slice image of the sample heart that is used for training the landmark detection network. For example, if the landmark detection network is used to perform landmark identification on a cardiac MRI image of a patient (or a portion thereof), the sample slice image may be a cardiac MRI image of another patient.

In some embodiments, a sample slice image may be annotated with at least one ground truth landmark of the sample heart, and the ground truth distance offset map may include distance information between each pixel of the sample slice image and each of the at least one ground truth landmark. The annotation of the at least one ground truth landmark in the sample slice image may be performed by a user (e.g., a doctor, a radiologist) manually, or a computing device (e.g., the processing device 140B) automatically according to an image analysis technique or semi-automatically according to an image analysis technique in combination with a user intervention.

In some embodiments, a training sample of a sample subject may be previously generated and stored in a storage device (e.g., the storage device 150, the storage 220, the storage 390, or an external database). The processing device 140B may retrieve the training sample directly from the storage device. In some alternative embodiments, at least a portion of the training sample may be generated by the processing device 140B. Merely by way of example, the processing device 140B may obtain a sample slice image annotated with one or more ground truth landmarks, and determine an offset of each pixel in the sample slice image relative to each ground truth landmark to generate a corresponding ground truth distance offset map.

In some embodiments, the sample slice images of the training samples may include slice images of different heart sections, and the generated landmark detection network may be used to perform landmark identification on a slice image of any heart section. Alternatively, the sample slice images of the training samples may include slice images of a specific heart section, and the generated landmark detection network may be applied to a slice image of the specific heart section. For example, the sample slice images at the basal section may be used to generate a landmark detection network for identifying landmarks in slice images of the basal section.

In 802, the processing device 140B (e.g., the model generation module 405, the interface circuits of the processor 210) may generate the landmark detection network by training a preliminary model using the plurality of training samples.

The preliminary model may be of any type of neural network model. In certain embodiments, the preliminary model may be a convolutional network. Exemplary CNN models may include a Fully Convolutional Network, such as a V-NET model, a U-NET model (e.g., a residual U-NET model, a dense U-NET model), a super-resolution CNN (SRCNN), etc. In some embodiments, the preliminary model may include one or more model parameters. Exemplary model parameters of the preliminary model may include the number (or count) of layers, the number (or count) of kernels, a kernel size, a stride, a padding of each convolutional layer, a loss function, or the like, or any combination thereof.

Before training, the processing device 140B may initialize parameter value(s) of the model parameter(s) of the preliminary model. In the training of the preliminary model, the processing device 140B may iteratively update the parameter value(s) of the preliminary model based on the plurality of training samples. For example, the processing device 140B may update the model parameter(s) of the preliminary model by performing one or more iterations, wherein at least one of the iteration(s) may include one or more operations of process 900 as described in connection with FIG. 9.

For illustration purposes, a current iteration of the iteration(s) is described in the following description. The current iteration may include one or more operations of process 900 illustrated in FIG. 9 and be performed based on at least some of the training samples. In some embodiments, a same set or different sets of training samples may be used in different iterations in training the preliminary model.

In 901, for each of the at least some of the plurality of training samples, the processing device 140B (e.g., the model generation module 405, the interface circuits of the processor 210) may generate a predicted distance offset map of the training sample by applying of an updated preliminary model determined in a previous iteration.

For example, for each of the at least one of the training samples, the corresponding sample slice image may be inputted into the updated preliminary model, and the updated preliminary model may output a predicted distance offset map of the sample slice image.

In 902, the processing device 140B (e.g., the model generation module 405, the interface circuits of the processor 210) may determine a value of a loss function of the updated preliminary model based on the predicted distance offset map and the ground truth distance offset map of each of the at least some of the plurality of training samples.

The loss function may be used to evaluate the accuracy and reliability of the updated preliminary model, for example, the smaller the loss function is, the more reliable the model is. In some embodiments, the processing device 140B may determine the value of the loss function based on a difference (e.g., an L1 distance, an L2 distance) between the predicted distance offset map and the ground truth distance offset map of each of the at least some of the training samples.

In 903, the processing device 140B (e.g., the model generation module 405, the processing circuits of the processor 210) may determine whether the value of the loss function is minimized in the current iteration.

For example, the value of the loss function may be regarded as being minimized if the value of the loss function obtained in the current iteration is less than a predetermined threshold (e.g., a constant). As another example, the value of the loss function may be regarded as being minimized if a certain count of iterations is performed, or the loss function converges such that the differences of the values of the loss function obtained in consecutive iterations are within a threshold (e.g., a constant), etc.

In response to a determination that the value of the loss function is minimized, the process 900 may proceed to 904, in which the processing device 140B (e.g., the model generation module 405, the processing circuits of the processor 210) may design the updated preliminary model in the current iteration as the landmark detection network.

In response to a determination that the value of the loss function is not minimized in the current iteration, the process 900 may proceed to 905, in which the processing device 140B (e.g., the model generation module 405, the processing circuits of the processor 210) may further update the updated preliminary model to be used in a next iteration. For example, the processing device 140B may update the parameter value(s) of the updated preliminary model based on the value of the loss function according to, for example, a backpropagation algorithm. In some embodiments, a model may include a plurality of parameter values, and updating the parameter values of the model refers to updating at least a portion of the parameter values of the model.

It should be noted that the above descriptions regarding the process 800 and the process 900 are merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 800 and/or the process 900 may be accomplished with one or more additional operations not described and/or without one or more of the operations discussed above. For example, the process 800 may include an additional operation to store the landmark detection network in a storage device (e.g., the storage device 150, the storage 220, and/or the storage 390) for further use (e.g., in process 500). As another example, after the landmark detection network is generated, the processing device 140B may further test the landmark detection network using a set of testing images. Additionally or alternatively, the processing device 140B may update the landmark detection network periodically or irregularly based on one or more newly-generated training images (e.g., new sample slice images generated in medical diagnosis).

FIG. 10 is a schematic diagram illustrating an exemplary process for generating a bullseye plot 1009 according to some embodiments of the present disclosure.

As shown in FIG. 10, a slice image 1001 including a heart of a patient corresponding to a basal section of the heart may be obtained and inputted into a cardiac segmentation network 1002. The cardiac segmentation network 1002 may output a segmented slice image 1003 in which a left ventricle (i.e., the white part), a right ventricle (i.e., the dark grey part), and a myocardium (i.e., the light grey part) are segmented from the slice image 1001. The segmented slice image 1003 may be further inputted into a landmark detection network 1004 to obtain a distance offset map of the segmented slice image 1003. An upper intersection point 1007 and a lower intersection point 1008 between the right ventricle and the myocardium may be determined based on the distance offset map and optionally a weight of each pixel in the segmented slice image 1003. Then, the myocardium may be segmented into six segments 1013-1018 based on the upper and lower intersection points as shown in an image 1006. For example, the segment 1013 may be determined based on the upper intersection point 1007. The remaining segments 1014-1018 may be determined by rotating clockwise with the angel step of 60° from the upper intersection point 1007. The segments 1013-1018 may correspond to six anatomical regions of the myocardium in the basal section (i.e., the basal anterior, the basal anteroseptal, the basal inferoseptal, the basal inferior, the basal inferolateral, and the basal anterolateral).

Further, the bullseye plot 1009 may be generated based at least partially on the segmentation result in the image 1006. For example, the outermost concentric ring 1010 of the bullseye plot 1009 may represent the basal section of the heart, and include sectors 1-6 representing the six anatomical regions of the myocardium in the basal section. For each anatomical region of the myocardium in the basal section, one or more parameter values indicative of the physiological condition of the anatomical region may be determined according to the segmentation result in the image 1006 and optionally other slice image(s) of the basal section. For example, one or more parameter values of the basal anterior may be determined based on the segment 1013 in the image 1006 and optionally a segmentation result of other slice image(s). The one or more parameter values of the basal anterior may then be annotated in the sector 1 of the bullseye plot 1009. Similarly, sectors 7-12 of the bullseye plot 1009 may be annotated based on slice image(s) of the mid-cavity section, sectors 13-16 may be annotated based on slice image(s) of the apical section, and sector 17 may be annotated based on slice image(s) of the apex.

It should be noted that the example illustrated in FIG. 10 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one of the upper intersection point 1007 and the lower intersection point 1008 may be identified from the segmented slice image 1003. Additionally or alternatively, the bullseye plot 1009 may have presented in any other form. For example, the sector 17 may be omitted.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±1%, ±5%, ±10%, or ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for generating a bullseye plot of a heart of a subject, the heart including a left ventricle, a right ventricle, and a myocardium around the left ventricle, the system comprising:
   at least one storage device including a set of instructions; and
   at least one processor configured to communicate with the at least one storage device, wherein when executing the set of instructions, the at least one processor is configured to direct the system to perform operations including:
      obtaining multiple slice images in a plurality of groups, wherein the plurality of groups correspond to a plurality of sections substantially perpendicular to a long axis of the heart, each group corresponds to one of the plurality of sections and includes at least one slice image of the corresponding section, and each slice image includes part of the right ventricle, part of the left ventricle, and part of the myocardium;
      in each of the multiple slice images,
         identifying at least one landmark associated with the left ventricle by applying a landmark detection network, the at least one landmark corresponding to a physical point that reflects an anatomical feature of at least one of the left ventricle or the right ventricle and being used for automatic bullseye plot generation; and
         generating, based on the at least one landmark identified in each of the multiple slice images, the bullseye plot of the heart, wherein the bullseye plot includes a plurality of sectors, each of which represents an anatomical region of the myocardium in one of the plurality of sections.

2. The system of claim 1, wherein the obtaining the multiple slice images in the plurality of groups includes:

obtaining a target image volume including the heart of the subject;

segmenting, from the target image volume, the right ventricle, the left ventricle, and the myocardium of the heart via a cardiac segmentation network to obtain a segmented target image volume; and for each of the plurality of sections, extracting the at least one slice image corresponding to the section from the segmented target image volume.

3. The system of claim 2, wherein the segmentation of the right ventricle, the left ventricle, and the myocardium of the heart is performed by applying the cardiac segmentation network, and the cardiac segmentation network is a convolutional network.

4. The system of claim 1, wherein the identifying at least one landmark associated with the left ventricle in a slice image by applying a landmark detection network includes:

obtaining a distance offset map of the slice image by inputting the slice image into the landmark detection network, the distance offset map including distance information between each pixel of the slice image and each of one or more estimated landmarks; and determining, based on the distance offset map and a weight of each pixel of the slice image, the position of the at least one landmark in the slice image.

5. The system of claim 1, wherein the at least one landmark in a slice image includes:

an upper intersection point between the right ventricle and the myocardium in the slice image, or a lower intersection point between the right ventricle and the myocardium in the slice image.

6. The system of claim 1, wherein the generating the bullseye plot of the heart based on the at least one landmark identified in each of the plurality of slice images includes:

for each slice image corresponding to each of the plurality of sections, segmenting, based on the at least one landmark identified in the slice image, the myocardium in the slice image into a plurality of segments corresponding to a plurality of anatomical regions of the myocardium in the section; and for each anatomical region of the myocardium in each of the plurality of sections, determining a parameter value indicative of a physiological condition of the anatomical region according to the segmentation result of the at least one slice image corresponding to the section; and annotating the sector representing the anatomical region in the bullseye plot according to the parameter value of the anatomical region.

7. The system of claim 1, wherein the plurality of sections include a basal section, a mid-cavity section, and an apical section.

8. The system of claim 1, wherein the landmark detection network is trained according to a model training process, the model training process including:

obtaining a plurality of training samples, each of the plurality of training samples including a sample slice image of a sample heart and a ground truth distance offset map of the sample slice image, the sample slice image being annotated with at least one ground truth landmark of the sample heart, and the ground truth distance offset map including distance information between each pixel and each of the at least one ground truth landmark of the sample slice image; and generating the landmark detection network by training a preliminary model using the plurality of training samples.

9. A system, comprising:

at least one storage device storing a set of instructions for generating a landmark detection network; and at least one processor configured to communicate with the at least one storage device, wherein when executing the set of instructions, the at least one processor is configured to direct the system to perform operations including:

obtaining a plurality of training samples, each of the plurality of training samples including a sample slice image of a sample heart and a ground truth distance offset map of the sample slice image, the sample slice image being annotated with at least one ground truth landmark of the sample heart, and the ground truth distance offset map including distance information between each pixel and each of the at least one ground truth landmark of the sample slice image, the at least one ground truth landmark corresponding to a physical point that reflects an anatomical feature of at least one of a left ventricle or a right ventricle in the sample heart and being used for automatic bullseye plot generation; and generating the landmark detection network by training a preliminary model using the plurality of training samples.

10. The system of claim 9, wherein the at least one ground truth landmark annotated in a sample slice image includes:

an upper intersection point between a right ventricle and a myocardium of the sample heart in the sample slice image, or a lower intersection point between the right ventricle and the myocardium of the sample heart in the sample slice image.

11. The system of claim 9, wherein the landmark detection network is a convolutional network, which includes at least one of a U-NET model, a residual U-NET model, or a dense U-NET model.

12. The system of claim 9, wherein the generating the landmark detection network by training a preliminary model using the plurality of training samples includes:

initializing parameter values of the preliminary model; and training the preliminary model by iteratively updating the parameter values of the preliminary model based on the plurality of training samples.

13. The system of claim 12, wherein the iteratively updating the parameter values of the preliminary model includes performing an iterative operation including one or more iterations, and each of at least one iteration of the iterative operation includes:

for each of at least some of the plurality of training samples, generating a predicted distance offset map by applying of an updated preliminary model determined in a previous iteration;

determining, based on the predicted distance offset map and the ground truth distance offset map of each of the at least some of the plurality of training samples, a value of a loss function of the updated preliminary model; and further updating the parameter values of the updated preliminary model to be used in a next iteration based on the value of the loss function.

14. The system of claim 9, wherein the at least one processor is further configured to direct the system to perform the operations including:

obtaining multiple slice images in a plurality of groups, wherein each group includes at least one slice image, each group corresponds to a section substantially perpendicular to a long axis of the heart, and each slice image includes part of the right ventricle, part of the left ventricle, and part of the myocardium;

in each of the multiple slice images, identifying at least one landmark associated with the left ventricle by applying the landmark detection network; and generating, based on the at least one landmark identified in each of the multiple slice images, the bullseye plot of the heart, wherein the bullseye plot includes a plurality of sectors, each of which represents an anatomical region of the myocardium in one of the plurality of sections.

15. A method for generating a bullseye plot of a heart of a subject, the method being implemented on a computing device having at least one processor and at least one storage device, the heart including a left ventricle, a right ventricle, and a myocardium around the left ventricle, the method comprising:

obtaining multiple slice images in a plurality of groups, wherein the plurality of groups correspond to a plurality of sections substantially perpendicular to a long axis of the heart, each group corresponds to one of the plurality of sections and includes at least one slice image of the corresponding section, and each slice image includes part of the right ventricle, part of the left ventricle, and part of the myocardium;

in each of the multiple slice images,
identifying at least one landmark associated with the left ventricle by applying a landmark detection network, the at least one landmark corresponding to a physical point that reflects an anatomical feature of at least one of the left ventricle or the right ventricle and being used for automatic bullseye plot generation; and generating, based on the at least one landmark identified in each of the multiple slice images, the bullseye plot of the heart, wherein the bullseye plot includes a plurality of sectors, each of which represents an anatomical region of the myocardium in one of the plurality of sections.

16. The method of claim 15, wherein the obtaining the multiple slice images in the plurality of groups includes:

obtaining a target image volume including the heart of the subject;

segmenting, from the target image volume, the right ventricle, the left ventricle, and the myocardium of the heart via a cardiac segmentation network to obtain a segmented target image volume; and for each of the plurality of sections, extracting the at least one slice image corresponding to the section from the segmented target image volume.

17. The method of claim 16, wherein the segmentation of the right ventricle, the left ventricle, and the myocardium of the heart is performed by applying the cardiac segmentation network, and the cardiac segmentation network is a convolutional network.

18. The method of claim 15, wherein the identifying at least one landmark associated with the left ventricle in a slice image by applying a landmark detection network includes:

obtaining a distance offset map of the slice image by inputting the slice image into the landmark detection network, the distance offset map including distance information between each pixel of the slice image and each of one or more estimated landmarks; and determining, based on the distance offset map and a weight of each pixel of the slice image, the position of the at least one landmark in the slice image.

19. The method of claim 15, wherein the at least one landmark in a slice image includes:

an upper intersection point between the right ventricle and the myocardium in the slice image, or a lower intersection point between the right ventricle and the myocardium in the slice image.

20. The method of claim 15, wherein the generating the bullseye plot of the heart based on the at least one landmark identified in each of the plurality of slice images includes:

for each slice image corresponding to each of the plurality of sections, segmenting, based on the at least one landmark identified in the slice image, the myocardium in the slice image into a plurality of segments corresponding to a plurality of anatomical regions of the myocardium in the section; and for each anatomical region of the myocardium in each of the plurality of sections, determining a parameter value indicative of a physiological condition of the anatomical region according to the segmentation result of the at least one slice image corresponding to the section; and annotating the sector representing the anatomical region in the bullseye plot according to the parameter value of the anatomical region.

* * * * *